(12) United States Patent
Chai et al.

(10) Patent No.: US 9,246,781 B2
(45) Date of Patent: Jan. 26, 2016

(54) METHOD, TERMINAL, APPARATUS, AND SYSTEM FOR DEVICE MANAGEMENT

(71) Applicant: HUAWEI TECHNOLOGIES CO., LTD., Shenzhen, Guangdong (CN)

(72) Inventors: Xiaoqian Chai, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/466,825

(22) Filed: Aug. 22, 2014

(65) Prior Publication Data

US 2014/0365630 A1 Dec. 11, 2014

Related U.S. Application Data

(63) Continuation of application No. 12/850,341, filed on Aug. 4, 2010, now abandoned, which is a continuation of application No. PCT/CN2008/071785, filed on Jul. 28, 2008.

(30) Foreign Application Priority Data

Feb. 4, 2008 (CN) .......................... 2008 1 0057697

(51) Int. Cl.
*H04L 29/06* (2006.01)
*H04L 12/26* (2006.01)
(Continued)

(52) U.S. Cl.
CPC ............ *H04L 43/0811* (2013.01); *H04L 12/24* (2013.01); *H04L 41/00* (2013.01);
(Continued)

(58) Field of Classification Search
CPC .................... H04L 43/0811; H04L 41/0233
See application file for complete search history.

(56) References Cited

U.S. PATENT DOCUMENTS 6,580,752 B1 6/2003 Amrany et al.
7,117,491 B2 10/2006 Ferreira Alves et al.
(Continued)

FOREIGN PATENT DOCUMENTS

| CN | 1251929 A | 5/2000 |
|---|---|---|
| CN | 1695139 A | 11/2005 |

(Continued)

OTHER PUBLICATIONS

Open Mobile Alliance: OMA Device Management Tree and Description, Approved Version 1.2, Feb. 9, 2007, XP-002624032, Retrieved from the Internet: URL:http://member.openmobilealliance.org/ftp/Public_documents/DM/ Permanent_documents/OMA-TS-DM_TND-V1_2-20070209-A.zip, 48 pages.
(Continued)

*Primary Examiner* — Izunna Okeke
*Assistant Examiner* — Ali Shayanfar
(74) *Attorney, Agent, or Firm* — Huawei Technologies Co., Ltd.

(57) ABSTRACT

A method, a terminal, an apparatus, and a system for device management (DM) are provided. Specifically, a DM terminal, a DM apparatus, method for managing the terminal device are provided. The method for managing the terminal device includes the following steps: adding, by a DM terminal device, management nodes in a DM tree of the DM terminal device; and recording, by the DM terminal device, MOs types supported by the DM terminal device in the management nodes added in the DM tree of the DM terminal device. Therefore, the problem that the server does not know the DM applications supported by the terminal, and in the method, a specific management operation is delivered to make the management of the server more flexible and effective.

3 Claims, 8 Drawing Sheets

A terminal receives bootstrap information of a server, in which the bootstrap information includes a ServerID of the server The terminal performs bootstrap or re-bootstrap through the bootstrap information

(51) Int. Cl.
H04L 12/24 (2006.01)
H04L 12/911 (2013.01)

(52) U.S. Cl.
CPC ......... H04L 41/024 (2013.01); H04L 41/0206 (2013.01); H04L 41/0803 (2013.01); H04L 47/70 (2013.01); *H04L 41/0233* (2013.01); *H04L 41/0853* (2013.01)

(56) References Cited

U.S. PATENT DOCUMENTS

| | | | |
|---|---|---|---|
| 7,974,613 | B1 | 7/2011 | Shanker et al. |
| 2003/0204640 | A1 | 10/2003 | Sahinoja et al. |
| 2004/0123241 | A1 | 6/2004 | Kaappa et al. |
| 2004/0158583 | A1 | 8/2004 | Kaappa |
| 2005/0010522 | A1 | 1/2005 | Kusu |
| 2005/0010552 | A1 | 1/2005 | Kaappa et al. |
| 2006/0143179 | A1 | 6/2006 | Draluk et al. |
| 2006/0212558 | A1 | 9/2006 | Sahinoja et al. |
| 2006/0236325 | A1 | 10/2006 | Rao et al. |
| 2007/0106770 | A1 | 5/2007 | Alnas |
| 2007/0143466 | A1 | 6/2007 | Shon et al. |
| 2007/0207800 | A1 | 9/2007 | Daley et al. |
| 2007/0226749 | A1 | 9/2007 | Pedersen et al. |
| 2007/0250933 | A1 | 10/2007 | Rantanen |
| 2007/0294385 | A1 | 12/2007 | Kapadekar et al. |
| 2008/0043726 | A1 | 2/2008 | Herrero-Veron et al. |
| 2008/0114570 | A1 | 5/2008 | Li et al. |
| 2008/0208928 | A1 | 8/2008 | Hernandez |
| 2008/0271023 | A1 | 10/2008 | Bone et al. |
| 2008/0288630 | A1* | 11/2008 | Merat ............ G06F 11/1451 709/224 |
| 2009/0040947 | A1 | 2/2009 | Krivopaltsev |
| 2009/0111467 | A1* | 4/2009 | Chai ............ H04L 12/24 455/435.1 |
| 2009/0111476 | A1* | 4/2009 | Hamalainen et al. ......... 455/450 |
| 2010/0037238 | A1 | 2/2010 | Ferrazzini et al. |
| 2011/0196966 | A1* | 8/2011 | Chai ............ H04L 41/28 709/225 |
| 2012/0059924 | A1* | 3/2012 | Zhang ............ H04L 29/1216 709/223 |
| 2012/0066367 | A1* | 3/2012 | Chai ............ H04L 12/24 709/223 |

FOREIGN PATENT DOCUMENTS

| | | |
|---|---|---|
| CN | 1714350 A | 12/2005 |
| CN | 1741454 A | 3/2006 |
| CN | 1969504 A | 5/2007 |
| CN | 101014178 A | 8/2007 |
| CN | 101080077 A | 11/2007 |
| CN | 101083554 A | 12/2007 |
| CN | 101083608 A | 12/2007 |
| CN | 101114933 A | 1/2008 |
| CN | 101505550 B | 8/2012 |
| JP | 2005524182 A | 8/2005 |
| JP | 2007181219 A | 7/2007 |
| JP | 2007535832 A | 12/2007 |
| JP | 2009516467 A | 4/2009 |
| WO | 9934557 A1 | 7/1999 |
| WO | 03094435 A1 | 11/2003 |
| WO | 2004054298 A1 | 6/2004 |
| WO | 2007064167 A1 | 6/2007 |
| WO | 2007122043 A1 | 11/2007 |
| WO | 2009100632 A1 | 8/2009 |

OTHER PUBLICATIONS

Open Mobile Alliance: OMA Device Management Tree and Description Serialization, Approved 1.2, Feb. 9, 2007, XP-002627097, Retrieved form the Internet: URL:http://member.openmobilealliance.org/ftp/Public_documents/DM/Permanent_documents/OMA-TS-DM-TNDS-V1_2-20070209-A.zip, 20 pages.

Bushby, S.T.: "BACnet<TM>: A Standard Communication Infrastructure for Intelligent Buildings," Automation in Construction, Elsevier Science B.V., Amsterdam, The Netherlands, vol. 6, 1997, pp. 529-540.

Haakenstad, L.K.: "The Open Protocol Standard for Computerized Building Systems: BACnet," Proceedings of the 1999 IEEE International Conference on Control Applications, Kohala Coast, Hawaii, Aug. 22-27, 1999, 6 pages.

Open Mobile Alliance: OMA Device Management Protocol Candidate Version 1.2, Jun. 2, 2006, OMA-TS-DM_Protocol-V1_2-20060606-C, 50 pages.

SyncML (Device Management), URL: http://www.mobilepockets.jp/jp/tech/spec/syncml_dm.pdf; Fujisystems, Inc., Jul. 2, 2004, 28 pages.

Horiuchi, Hiroki, "Advancing Network Management Technologies for Sophisticated Communications," The Journal of the Institute of Electronics, Information and Communication Engineers; DENSHI-JOHO-TSUSHIN-GAKKAI; Dec. 1, 2004, vol. 87, No. 12, pp. 1021-1028.

Open Mobile Alliance, Enabler Release Definition for OMA Device Management, OMA-ERELD-DM-V1_2-20070209-A, Approved Version 1.2—Feb. 9, 2007, 14 pages.

Open Mobile Alliance, Device Management Requirements, OMA-RD-DM-V1_2-20070209-A, Approved Version 1.2—Feb. 9, 2007, 62 pages.

Device Management Working Group, Device Management, Registration Version: 1, Registration Timestamp: Jun. 2, 2006, OMA-SUP-ac_w7_dm-V1_0-20070209-A.txt, 6 pages.

Open Mobile Alliance, OMA Permanent Document, OMA-SUP-MO_DM_DevDetail-V1_2-20070209-A, 2005-2007, Public Reachable Information: Path: http://www.openmobilealliance.org/tech/omna/dm_mo; Name: dm_devdetail-v1_2.ddf, 7 pages.

Open Mobile Alliance, OMA Permanent Document, MA-SUP-MO_dm_devinfo-V1_2-20070209-A, 2005-2007, Public Reachable Invormation: Path: http://www.openmobilealliance.org/tech/omna/dm_mo, Name: dm_devinfo-v1_2.ddf, 5 pages.

Open Mobile Alliance, OMA Permanent Document, OMA-SUP-MO_dm_dmacc-V1_2-20070209-A, 2005-2007, Public Reachable Information: Path: http://www.openmobilealliance.org/tech/omna/dm_mo; Name: dm_dmacc-v1_2.ddf, 10 pages.

Open Mobile Alliance, OMA Device Management Bootstrap, OMA-TS-DM_Bootstrap-V1_2-20070209-A, Approved Version 1.2—Feb. 9, 2007, 28 pages.

Open Mobile Alliance, OMA Device Management Notification Initiated Session, OMA-TS-DM_Notification-V1_2-20070209-A, Approved Version 1.2—Feb. 9, 2007, 16 pages.

Open Mobile Alliance, OMA Device Management Protocol, OMA-TS-DM_Protocol-V1_2-20070209-A, Approved Version 1.2—Feb. 9, 2007, 17 pages.

Open Mobile Alliance, OMA Device Management Representation Protocol, OMA-TS-DM_RepPro-V1_2-20070209-A, Approved Version 1.2—Feb. 9, 2007, 47 pages.

Open Mobile Alliance, OMA Device Management Security, OMA-TS-DM_Security-V1_2-20070209-A, Approved Version 1.2—Feb. 9, 2007, 27 pages.

Open Mobile Alliance, OMA Device Management Standardized Objects, OMA-TS-DM_StdObj-V1_2-20070209-A, Approved Version 1.2—Feb. 9, 2007, 29 pages.

* cited by examiner

FIG. 6

A server sends a Get command carrying path information of a target operation and value filtering information that needs to be acquired

↓

After receiving the Get command, the terminal is instructed by the Get command to acquire structure information of a designated subtree and property information of a node, and returns the property value and the structure information to the server

FIG. 7

The server carries an instruction of sequentially executing a plurality of subitems in the management command in the sent management command

↓

After receiving the instruction, the terminal parses the instruction of sequential execution, and sequentially executes the management command operations on the management node corresponding to each sub-item in the management command

FIG. 8

METHOD, TERMINAL, APPARATUS, AND SYSTEM FOR DEVICE MANAGEMENT

CROSS-REFERENCE TO RELATED APPLICATIONS

This application is a continuation of U.S. patent application Ser. No. 12/850,341, filed on Aug. 4, 2010, which is a continuation of International Application No. PCT/CN2008/071785, filed on Jul. 28, 2008. The International Application claims priority to Chinese Patent Application No. 200810057697.0, filed on Feb. 4, 2008, each of which is incorporated by reference in its entirety.

FIELD OF THE TECHNOLOGY

The present disclosure relates to a method, a terminal, an apparatus, and a system for device management (DM), which is in the technical field of network communication.

BACKGROUND OF THE APPLICATION

A mobile terminal is an important component in the entire mobile operation service system. Device management (DM) means that a data packet is downloaded to a terminal device from a network side in an Over The Air (OTA) mode and the terminal device is instructed to perform processing, so as to accomplish subsequent functions such as parameter configuration, software installation, and error diagnosis.

In DM specifications designed via the Open Mobile Alliance DM (OMA DM), protocol support for management of a terminal device is already achieved. FIG. 1 is a schematic view of the overall structure for a DM server to manage a terminal device. A DM client on the terminal device is adapted to explain and execute a management command delivered by the DM server. A DM management tree on the terminal device may be regarded as an interface that the DM server manages the terminal device through a DM protocol. A group of Management Objects (MOs) exist in the management tree. The DM server achieves the objective of managing terminal resources through an operation on a node (a management node) in the MO.

As shown in FIG. 1, in the prior art, the DM management is performed through two steps, namely, bootstrap and subsequent management. The bootstrap occurs before a management session between a server and a terminal device is established for actual management, and is adapted to configure account information (such as user name and password) and other parameters (such as a connection parameter). In the subsequent management process, a management session is established. The server may acquire some basic information (such as firmware version, software version, and large object support) of the terminal through the MO of the terminal device, and use the information as a reference for subsequent management actions.

In the prior art, although the protocol support for the management of the terminal device is already achieved, problems such as management effectiveness, efficiency, and communication traffic still exist. For example, a server may not obtain an address of a terminal DM object and DM capabilities supported by the terminal (such as capabilities of support for software component management and support for firmware upgrade) rapidly and the terminal uses a SmartCard for re-bootstrap, which are specifically as follows.

1. After the terminal is locally re-bootstrapped (for example, after the device is changed), the server does not know that the terminal is bootstrapped, so that the authentication-related information stored in the server might be inconsistent with the authentication-related information after the terminal is bootstrapped, resulting in that identity authentication may not be accomplished for the two parties, so that normal management fails.

2. In order to enable the server to obtain situations about limits of the management tree by the terminal device or the implementation of the management tree by the terminal, in the prior art, a terminal manufacturer describes its device and releases the description for reference by a DM party through the Device Description Framework (DDF). However, in the existing protocol, a server side is unable to find its corresponding DDF through the terminal device, so that it is more difficult for the server to acquire the DDF.

3. The server may not obtain Management Object (MO) types supported by the terminal and also wastes network resources. As the DDF is usually static or is scarcely changed dynamically, it is difficult for the server to obtain all MO types supported by the terminal according to the DDF. The server determines whether the terminal supports a certain DM capability through a result returned by the terminal only after a corresponding management command is delivered, and the delivered management command carries a large amount of data (for example, software component management), so that server and network resources are wasted.

4. In the prior art, the server may not acquire a specific property value of all management nodes in a certain management subtree on a device management tree in batch in a non-serialized mode, and so the properties need to be acquired for several times, resulting in low efficiency.

5. It is very difficult for the server to locate the management node of the terminal and air resources are consumed. In order to acquire the terminal management node, the server might need to interact with the terminal for several times or acquire the entire directory structure of the terminal, so that the air resources are occupied and load on the server is increased.

6. In the prior art, the server may not instruct the terminal to sequentially execute a plurality of elements in a single management command, so that an action that requires sequential execution has to be divided into a plurality of management commands that are executed sequentially for implementation, so the cost for message management and parsing and execution by the terminal is increased.

7. When it takes a long time for the terminal or server to process an action, the session might be interrupted, such that the management action fails to be accomplished. Thus, the management that takes a long time becomes difficult. In addition, when a party confirms that a management command needs to be sent before long, the current session may not be maintained and the current session might be interrupted. The management session must be reestablished when the management command needs to be sent subsequently, causing a large cost.

8. When the terminal has a plurality of MO instances, the server does not know which instance is activated currently, resulting in higher difficulty in server management.

SUMMARY OF THE APPLICATION

In an embodiment, the present disclosure is to solve a first technical problem in the prior art that normal management may not be performed after a user performs bootstrap.

In an embodiment, the present disclosure is to solve a second technical problem in the prior art that it is difficult for a protocol server to acquire its corresponding device description framework (DDF).

In an embodiment, the present disclosure is to solve a third technical problem in the prior art that a server may not acquire a specific property value of all management nodes in a management subtree on a device management tree in batch in a non-serialized mode.

In an embodiment, the present disclosure is to solve a fourth technical problem in the prior art that it is difficult for a server to locate a management node of a terminal, air resources are wasted, and a load of the server is high.

In an embodiment, the present disclosure is to solve a fifth technical problem that an existing server may not instruct a terminal to execute a plurality of elements in a single management command sequentially.

In an embodiment, the present disclosure is to solve a sixth technical problem in the prior art that unexpected interruption may occur in a session when a method for maintaining a session is unavailable.

In an embodiment, the present disclosure is to solve a seventh technical problem in the prior art that when a terminal has a plurality of Management Object (MO) instances, a server does not know a currently activated instance, so that difficulty in managing a server is increased.

A method for device management, including: establishing, a management session between a server and a terminal; sending, by the server, a Get command to the terminal, wherein the Get command carries an Item/Data element carrying an identifier of an management object (MOID) to be retrieved, and carries an Item/Target/LocURI element carrying a root node URI of a subtree in a device management tree and a parameter instructing retrieve, wherein the parameter instructs the terminal to retrieve and return the root node URI of the occurrence of the management object (MO) in the subtree; receiving, by the terminal, the Get command, and retrieving the occurrences of the MO that is possessed of access right by the server in the subtree; and returning, by the terminal, status information of the Get command and the root node URI of the found MO following after the status information to the server when the terminal finds one or more occurrences of the MO; or returning status information of the Get command when the terminal does not find any occurrence of the MO to the server.

A device management (DM) terminal, including: a fourth receiving module, adapted to receive a Get command, wherein the Get command carries an identifier (ID) of an management object (MO) (MOID) to be retrieved and carries a root node path of a subtree in a device management tree and a parameter instructing retrieve, and the parameter instructs the terminal to retrieve and return the root node URI of the occurrence of the MO of the subtree; and a retrieve module, adapted to retrieve the occurrence of the MO that the server has an access right in the subtree, return status information of the Get command, and the root node URI of the found MO following after the status information to the server.

A device management (DM) apparatus, including: a third sending module, adapted to send a Get command, wherein the Get command carries an identifier (ID) of a management object (MO) (MOID) to be retrieved, and a root node URI of a subtree in a device management tree, and a parameter instructing retrieve, and the parameter instructs a terminal to retrieve and return the root node URI of the occurrence of the MO in the subtree; and a fifth receiving module, adapted to receive status information of the Get command and the root node URI of the occurrence of the MO of the subtree returned by the terminal.

A system of device management, including a terminal and a server, where the terminal includes: a fourth receiving module, adapted to receive a Get command, wherein the Get command carries an identifier (ID) of an MO (MOID) to be retrieved, and a root node URI of a subtree in a device management tree, and a parameter instructing retrieve, and the parameter instructs the terminal to retrieve and return the root node URI of the occurrence of the MO in the subtree, and a retrieve module, adapted to retrieve an MO that the server has an access right in the subtree, return status information of the Get command, and the root node URI of the found MO following after the status information to the server; the server includes: a third sending module, adapted to send the Get command, wherein the Get command carries the ID of the MO (MOID) to be retrieved, and the root node URI of the subtree in the device management tree, and the parameter instructing the retrieve, and the parameter instructs the terminal to retrieve and return the root node URI of the occurrence of the MO in the subtree, and a fifth receiving module, adapted to receive the status information of the Get command and the root node URI of the MO in the subtree returned by the terminal.

The technical solutions of the present disclosure are further described in detail with reference to the following accompanying drawings and embodiments.

BRIEF DESCRIPTION OF THE DRAWINGS

FIG. 6 is a schematic view of adding a support node in a device management tree in a terminal management method according to an embodiment of the present disclosure;

FIG. 7 is a schematic view of a method for retrieving an MO address according to an embodiment of the present disclosure;

FIG. 8 is a flow chart of a method for managing an execution mode of a command according to an embodiment of the present disclosure;

DETAILED DESCRIPTION OF THE EMBODIMENTS

Figure 1:
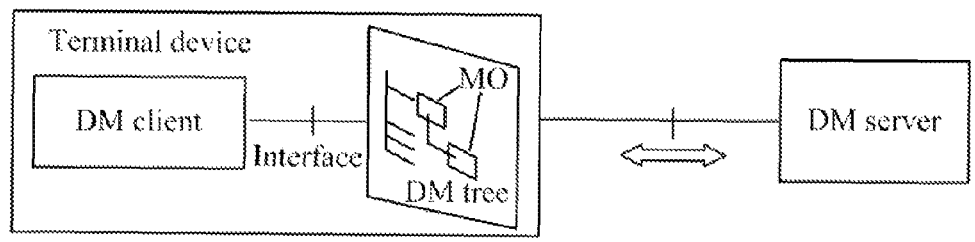
FIG. 1 is a schematic view of the overall structure for a DM server to manage a terminal device in the prior art.

The device management (DM) is mainly performed in two stages: a stage of bootstrap and a stage of subsequent management. The bootstrap occurs before a management session is established between a server and a terminal device, in which mainly configures account information (such as an address of the server, a user name, and a password) of the server and configures other parameters (such as information of a network access point) at the terminal. The information configured in the bootstrap stage is a basis for subsequent establishment of a management session. After the configuration of the account information of the server is accomplished, the server may manage the terminal. The management actions are accomplished via the management session established between server and the terminal device.

The improvement in the present disclosure is illustrated in detail in the following through two parts including bootstrap and the subsequent management session.

I. Bootstrap

A major object of bootstrap is to configure account information of a server to make it possible to establish a normal management session between a terminal and the server. At the same time, other related parameters such as connectivity settings may be further configured. The specific configuration method is as follows. The account information and the other related parameters of the server to be configured are encapsulated in a Client Provisioning (CP) file format or a Management Object (MO) serialization format, and the encapsulated bootstrap information is delivered to the terminal in a mode such as delivery pre-installation, OTA push, or Smart-Card. The terminal receives the encapsulated bootstrap information of the server containing a server identifier (ServerID) of the server, and the terminal uses the bootstrap information for bootstrap or re-bootstrap. The major work of the configuration is to convert the account information of the server in the bootstrap information into a server account MO in a terminal DM tree (referred to as DMAcc hereinafter) and other related MOs. Subsequently, the terminal initiatively connected to the server corresponding to the DMAcc activates a management status on the server. When the connection is being established, the server obtains a user name of the terminal through "LocName" (the value of the LocName is a value of a node named "AAUTHNAME" in the DMAcc MO), and further uses a password corresponding to the user name for authentication. In Message-Digest Algorithm 5 (MD5) authentication, a nonce further needs to be obtained to prevent the replay attack.

Among others, the SmartCard mode is a safe and convenient configuration mode, which may perform initial configuration conveniently and perform reconfiguration when a problem occurs to the account information of the terminal or when the terminal (for example, a mobile phone) is changed. When the terminal device locally performs reconfiguration on the configured account (for example, reconfiguration through the SmartCard mode), if the server has modified the password of the configured account in an OTA mode after the initial configuration, and the password corresponding to the account in the bootstrap information on the SmartCard is not modified yet, after the local reconfiguration of the terminal, the password on the DMAcc will be reset (the password is recovered to the original value before modification). The reconfiguration is a local action and the server is unable to know that the account information has been reconfigured, so that the password stored on the terminal is inconsistent with the password stored on the server. At this time, the server is unable to authenticate the terminal, and the management session may not be established.

In a first embodiment of the present disclosure, the bootstrap configuration problem is solved. Two main methods are illustrated as follows.

Figure 2:
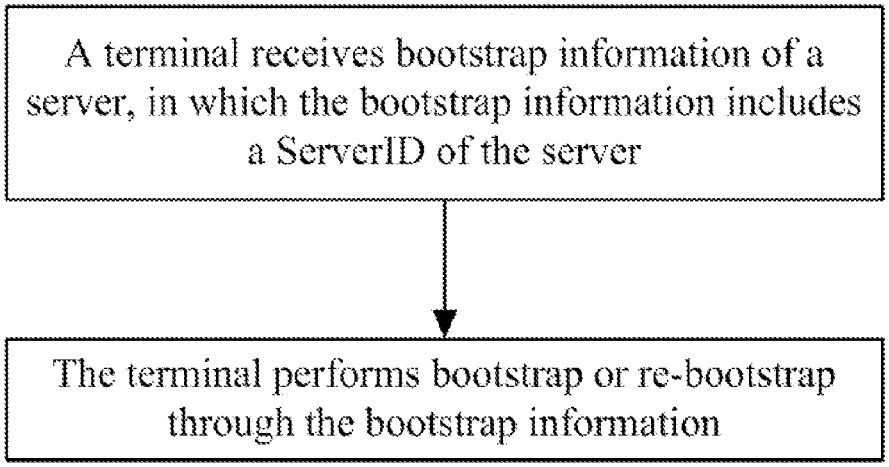
FIG. 2 is a flow chart of a bootstrap method according to an embodiment of the present disclosure.

1. As shown in FIG. 2, after the account information of a server is bootstrapped or re-bootstrapped the terminal sends a session request message to the server. The session request message is adapted to alert the server that the terminal is bootstrapped or re-bootstrapped.

After the server receives the session request message, a password and a nonce corresponding to a LocName carried in the session request message are acquired from the bootstrap information stored by the server to authenticate the terminal. After the authentication is successful, the authentication information at the server side is initialized or reset.

The method that the terminal alerts the server that the terminal is bootstrapped or re-bootstrapped is as follows.

After the terminal is bootstrapped or re-bootstrapped, the terminal sends a session request message to the server initiatively to inform the server that the terminal is bootstrapped or re-bootstrapped. The session request message may include terminal device information, LocName, terminal authentication information, and bootstrap or re-bootstrap alert information. A specific implementation method for the bootstrap or re-bootstrap alert information is as follows.

The terminal uses an "alert" command of a specific type code to implement the alert information. The alert command and its type code may specifically be a terminal information report alert command (that is, a Generic Alert, with a command type code of 1226), a terminal event report alert command (that is, a Client Event Alert, with a command type code of 1224), or a new session type for reporting the alert information, which is specifically as follows.

An event type needs to be defined first to adopt the Generic Alert or Client Event Alert, for example, org.openmobilealliance.dm.bootstrap. In the following, the Generic Alert is taken as an example. The method of using the Client Event Alert is similar to the following.

```
<Alert>
    <CmdID>2</CmdID>
    <Data>1226</Data> <!-- Generic Alert -->
    <Item>
        <Meta>
            <Type xmlns="syncml:metinf">
                org.openmobilealliance.dm.bootstrap <!-- event
                type -->
            </Type>
        </Meta>
    </Item>
</Alert>
```

The method of adding a new session type for reporting the alert information is as follows. A type code of a new alert command is added. The alert command that carries the type code is adapted to indicate a new session type. The type code may be 1202. An example is as follows.

```
<Alert>
<CmdID>1</CmdID>
<Data>1202</Data> <!-- indication of the session type: Bootstrap alert
session -->
</Alert>
```

The session request message initiated by the terminal to the server carries the bootstrap alert information. After the server receives the request message, the server knows that the terminal is bootstrapped or re-bootstrapped by parsing the alert information carried in the session request message, and then acquires a password in the bootstrap information stored at the server side to authenticate the terminal request. In the subsequent management, the server may update the password stored by the terminal.

For the sake of safety (for example, to prevent the problem that a malicious server intercepts the session request message and launches a replay attack), after authenticating the session request message sent by the terminal, the server may further initiate an authentication challenge to the terminal. The challenge carries a new nonce generated by the server. After receiving the challenge message sent by the server, the terminal generates new authentication information by using the new nonce and sends the authentication information to the server. The server authenticates the terminal again. After the authentication is successful, the server may perform other management operations, for example, update a server password.

The re-bootstrap may be automatically triggered by a terminal device in certain conditions (for example, a mobile phone card is inserted in a new mobile phone), or triggered by a user through a terminal user interface (UI).

2. If the bootstrap information on the SmartCard can be updated by the terminal, the bootstrap method is as follows. The terminal receives a DM command of the server to update a user name, a password or a nonce stored on a DMAcc MO of a DM tree of the terminal. After the update is successful, the terminal updates corresponding to a user name, a password or nonce information in the bootstrap file in the SmartCard automatically through the SmartCard operation command. Two situations after the foregoing processing are as follows.

1). If the update of the bootstrap file can ensure that the user name, password, and nonce of the server account carried in the bootstrap file are consistent with those stored by the server, the subsequent bootstrap is performed with the updated bootstrap file, and after the bootstrap, it does not need to inform the server (that is, it does not need a dedicated session for reporting the bootstrap event to the server).

2). If the update of the bootstrap file may not ensure that the user name, password, and nonce carried in the bootstrap file are consistent with those stored by the server, in order to control the update of the account data such as the user name, password or nonce effectively and facilitate synchronization between the server and the terminal, after the bootstrap file is updated, update information is recorded in the updated bootstrap file. The update information may be recorded by adding a version field. Also, when a session is established for the first time after the bootstrap by using the bootstrap file, the recorded update information is reported in a session request message. The server performs processing according to the update.

Figure 3:
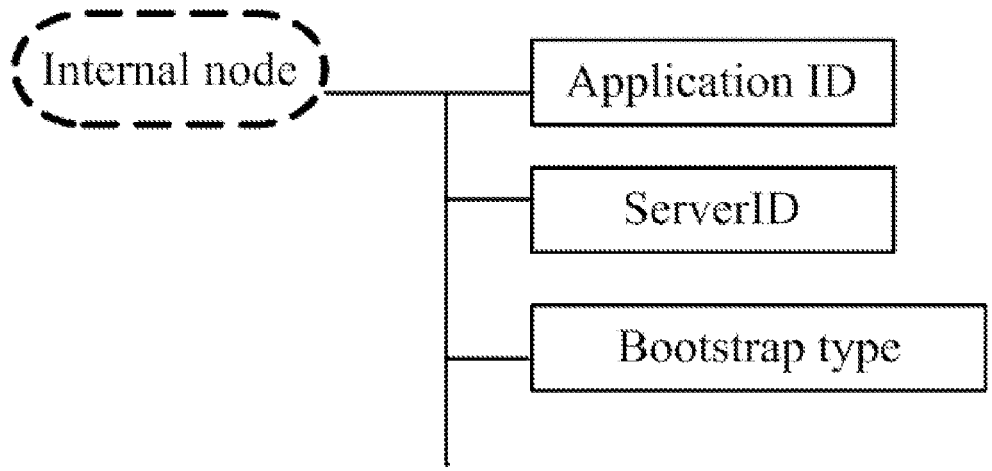
FIG. 3 is a schematic view of adding a bootstrap type management node to a DMAcc MO in the bootstrap method according to an embodiment of the present disclosure.

The bootstrap includes multiple modes. However, currently the information in the DMAcc MO of the device management tree generated by the bootstrap does not include records about in which bootstrap mode the account is generated. So that the server is unable to judge a safety level of the bootstrap through the bootstrap mode, and unable to take statistics of the bootstrap methods adopted for all terminals. In the second embodiment of the present disclosure, a method of solving the above problem is described as follows. In order to enable the server to obtain a source of the bootstrap of the terminal, in this embodiment, a management node (for example, a "Bootstraptype" in FIG. 3) is added in the DMAcc MO of the terminal DM tree to store in which mode the terminal is bootstrapped, that is, a bootstrap type. A specific embodiment is as shown in FIG. 3. The value of BootstrapType may be an integer, as shown in Table 1.

TABLE 1

Values of BootstrapType and corresponding meanings

| BootstrapType Management Node Value | Meaning |
|---|---|
| 0 | Delivery configuration |
| 1 | OTA mode MO Profile format Bootstrap |
| 2 | OTA mode CP Profile format Bootstrap |
| 3 | SmartCard mode MO Profile format Bootstrap |
| 4 | SmartCard mode CP Profile format Bootstrap |
| 5 | Other mode configurations |

After the terminal is successfully bootstrapped, the bootstrap mode is stored in a management node. The server delivers a Get command to the management node via the management session to acquire the bootstrap mode corresponding to the account in the terminal. After authenticating right of the server, the terminal returns the management node value.

In a third embodiment, the present disclosure describes a method for processing bootstrap information, so as to avoid a situation that a terminal performs bootstrap on the same ServerID account for several times to generate multiple DMAcc. The specific bootstrap method includes the following steps.

1. A management tree of the terminal is retrieved to determine whether a DMAcc MO corresponding to a ServerID already exists, which is as follows. It is compared whether a ServerID corresponding to a server account to be configured currently is the same as a value of a ServerID node of a DMAcc MO in the device management tree; if the ServerID corresponding to the server account to be configured currently is the same as the value of the ServerID node of the DMAcc MO in the device management tree, the corresponding account information exists; and if the ServerID corresponding to the server account to be configured currently is not the same as the value of the ServerID node of the DMAcc MO in the device management tree, the corresponding account information does not exist. If the DMAcc MO corresponding to the ServerID is found in the management tree of the terminal, Step 2 is performed; if the DMAcc MO corresponding to the ServerID is not found in the management tree of the terminal, Step 3 is performed.

2. It is determined whether the bootstrap operation is repetitive bootstrap or re-bootstrap (which may be determined in multiple modes, for example, through confirmation information of a user). If it is repetitive bootstrap, the bootstrap operation is cancelled. If it is re-bootstrap, data on the management node in the corresponding DMAcc MO on the device management tree is directly refreshed.

3. The account information in the bootstrap information is converted into the DMAcc MO in the terminal DM tree, and an access control list (ACL) is distributed for the DMAcc MO.

In the first embodiment in the foregoing, the bootstrap method is illustrated, which may effectively solve the problem that the server may not know whether the terminal is bootstrapped after the user is re-bootstrapped (for example, a device is changed) and subsequently normal management might fail under the influence of terminal information of the previous user. In the second embodiment, the problem that the server may not obtain a bootstrap mode of the terminal and may not judge a safety level of the bootstrap according to the bootstrap mode is solved. In the third embodiment, a processing method when the same ServerID is bootstrapped for several times is provided, so as to avoid the situation that a plurality of DMAcc MOs corresponding to the same ServerID exists in the terminal DM tree due to bootstrap conflict and avoid confusion of account management caused by repetitive bootstrap.

The improvements to the subsequent management session in the present disclosure are illustrated in detail as follows.

II. Management Session

After bootstrap is successfully performed on a terminal, a management session can be established between the server and the terminal, and management message can be exchanged in the session. The session includes a session establishment stage and a management stage. In the session establishment stage, identity is authenticated each other, and at the same time, the terminal reports terminal basic information stored on DevInfo MO. In the management stage, the server delivers a maintenance operation to a MO on the management tree of the terminal, so as to deliver a management action to the terminal. The management node of the device management tree has the ACL to control operation right of the server for the management node.

1. In order to enable the server to know limits to the management tree by the terminal device or the implementation situation of the management tree by the terminal, a device description framework (DDF) is adopted to describe the device. When the server needs to understand the device and perform management, the DDF of the device is acquired first, so as to manage the terminal according to the DDF. However, in the existing protocol, the server side may not find its corresponding DDF through the terminal device, which is more difficult for the server to acquire the DDF.

Figure 4:
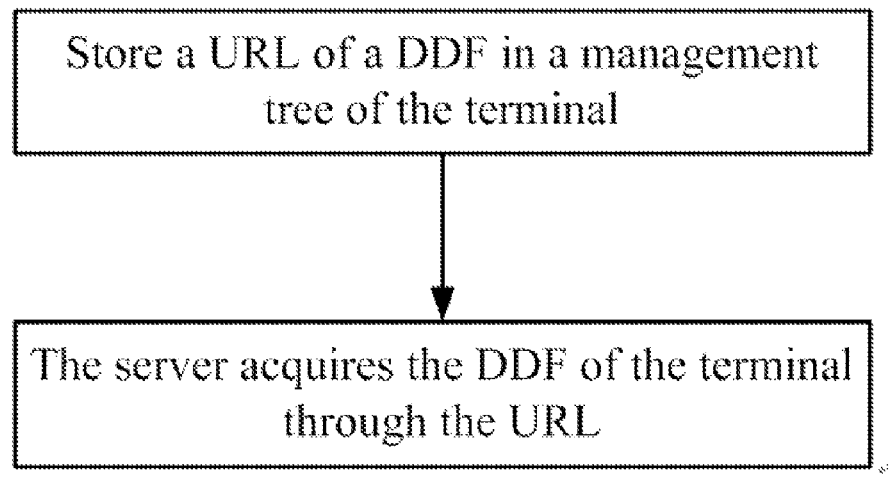
FIG. 4 is a flow chart of a method for acquiring a DDF according to an embodiment of the present disclosure.

The method for acquiring the DDF in the embodiment of the present disclosure is as shown in FIG. 4, which includes the following steps.

A uniform resource locator (URL) of the DDF is stored in a management tree of the terminal.

The server acquires the DDF of the terminal through the URL.

In order to facilitate the acquisition the DDF by the server side, the URL of the DDF may be stored in the management tree of the terminal so that the server may acquire the DDF of the terminal through the URL, or the DDF data may also be stored in the management tree of the terminal. Thus, the server may acquire its DDF information from the terminal directly, which is not limited to the embodiment in FIG. 4. The specific illustration is as follows.

An implementation method that the terminal stores the URL of the DDF is as follows. A management node is added in the DM tree of the terminal, and the URL of the DDF of the terminal is stored in the added management node (a plurality of DDFs might exist and a plurality of nodes may be used to store the URLs). Preferably, the above storage action is accomplished before delivery of the device, and during the use of the device the storage action may be updated according to actual situations (for example, a device manufacturer updates a storage address of the DDF). The added management node may be stored in an existing DevInfo MO or in device detail information (DevDetail) MO, or exists as an MO separately. The node property is as shown in Table 2.

TABLE 2

DDF management node property

| Node Value Format | Minimum ACL | Node Description |
|---|---|---|
| Chr | GET | A leaf node of the management tree, which is adapted to store a URL of a terminal DDF, for example: www.vendor.com/5251/dm_ddf.xml |

Two methods that the terminal stores the URL of the DDF and the management server acquires and uses the DDF are as follows.

In a first method, the terminal reports initiatively a value of the DDF management node or a position of the DDF management node. The specific method is as follows. The terminal reports in the following occasions.

In a first occasion, after a certain server account is configured for a terminal (for example, after bootstrap), the terminal initiates a registration session to the server (a first session between the terminal and the server). In the session, the value of the DDF management node or the position of the DDF management node is reported. In the subsequent management session, the value of the DDF management node and the position of the DDF management node are not reported initiatively, unless the server delivers a Get command to reacquire them (referring to Method 2). Preferably, the session request message of the management session carries the value of the DDF management node or the position of the DDF management node.

In a second occasion, the terminal reports the value of the DDF management node or the position of the DDF management node together with the DevInfo in the session request message of each management session.

If the position of storing the DDF management node is reported, in any subsequent management session, the server acquires the value of the DDF management node (the value of the DDF management node is URL information of the DDF) according to the position of storing the DDF management node.

After the server receives the URL information of the DDF and when the DDF is needed (for example, before detailed management or configuration of the terminal is implemented), specific DDF information is acquired according to the URL, and the terminal is managed according to a management command generated according to the DDF.

Figure 5:
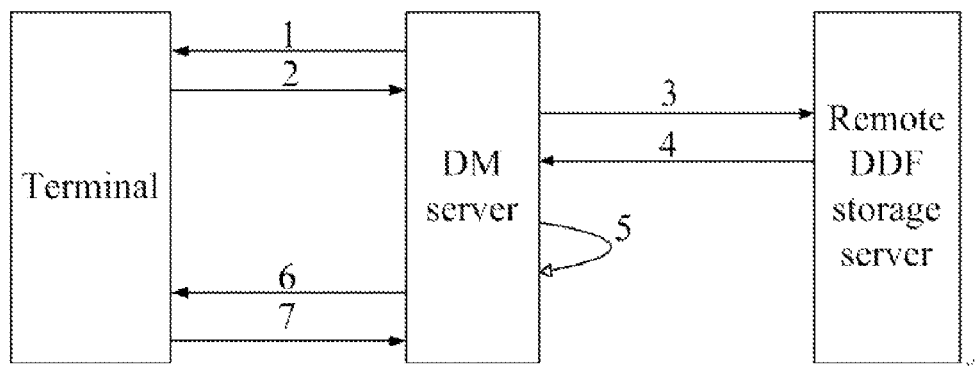
FIG. 5 is a schematic view of a parsing process of the method for acquiring a DDF according to the present disclosure.

In the second method, the server acquires the DDF information initiatively in the management session established between the server and the terminal. The specific process is as shown in FIG. 5, and specific steps are illustrated as follows.

In Step 1, a DM server acquires a URL stored in a DDF management node from a terminal in the management process. The specific method is as follows.

The terminal receives instruction information of the server. The instruction information is carried in a notification message (a session triggering message) sent by the server. The instruction information instructs the terminal to report the URL of the DDF of the terminal DM tree stored in the DDF management node or a URL of a DDF of a certain MO supported by the terminal. Subsequently, the terminal generates a session request message for initiating a management session according to the information in the notification. The URL is reported in the session request message. The specific report method is as follows. An alert type is extended for the terminal. The alert command carries the type and the URL. If it is the DDF of the MO, an MOID may further be carried. The server identifies the URL according to the alert type and the MOID.

Alternatively, the node is stored in the DevDetail MO or other MOs. The server acquires a value of the node through a Get command in the established management session. Taking the DevDetail MO as an example, if the server does not know the node and a path of the DevDetail MO storing the node in the terminal DM tree, the node is located through the following method.

The server acquires structure information of the terminal DM tree, and locates the position of the management node in the terminal DM tree directly by analyzing the structure information.

Alternatively, the server first acquires the position of the MO (DevDetail here) of the management node, which is specifically as follows. The server retrieves the position of the DevDetail MO through a Get command, or stores position information of the DevDetail in the DevInfo of the terminal. The terminal reports the position (a root node path) of the DevDetail MO to the server together with the DevInfo in the session request message (which may be reported in a first DM session, reported once, or reported in each session). The server locates the DDF management node according to the position of the DevDetail and the structure information of the DevDetail MO (a path of the DDF management node formed by connecting a path of the acquired DevDetail MO root node in the device management tree and a relative path of the DDF management node relative to the DevDetail root node the DevDetail structure).

After the position of the DDF management node is located, the Get command is delivered to acquire the value of the DDF management node.

In Step 2, the terminal returns an address of storing the DDF to the DM server. The specific method is as follows. If the node is stored in the DevInfo MO, the terminal carries the address in the session request message. If the node is stored in the DevDetail MO, the terminal returns the DDF address in a result message of a query command sent by the server.

In Step 3, the DM server communicates with a remote DDF storage server corresponding to the acquired DDF storage address to acquire the DDF.

In Step 4, the remote DDF storage server returns the DDF description file to the DM server.

In Steps 5 to 7, the DM server generates management actions by using the DDF as a reference for the subsequent management, and manages the terminal; the terminal returns an execution result.

In order to lower the cost for subsequent acquisition of the DDF, the DM server may buffer the acquired DDF data locally.

An implementation method that the terminal stores the DDF is as follows. A management node is added in the DM tree of the terminal. The management node is added in a certain MO in the terminal DM tree, and content of the DDF is stored in the node. A value may be assigned to the node before device delivery. During use of the device, the DM client performs update according to actual situations. Preferably, the node is added in the DevDetail MO. The node property is as shown in Table 3.

TABLE 3

DDF management node property

| Node Value Format | Minimum ACL | Node Description |
| --- | --- | --- |
| xml | Get | A leaf node of a management tree, adapted to store definition of a terminal DDF. |

In the method, the server acquires a value of the node which is content of the DDF in a management process. Specifically, four methods are illustrated as follows by taking an example that the value of the node is stored in the DevDetail.

In a first method, a server locates a position of a management node of the DDF directly to acquire the DDF, which is specifically as follows. The server first acquires a structure of a device management tree by delivering a Get command, and locates the management node directly through the structure of a device management tree. Alternatively, the terminal first reports the position of the management node in a session request message (which may be reported in the first DM session, reported only once, or reported in each session). Subsequently, the server delivers a command to acquire the value (that is, the DDF) of the management node, and the value is used as a reference for subsequent management.

In a second method, the server first acquires a position of the DevDetail in the device management tree, and locates the position of the DDF management node indirectly, so as to acquire the DDF, which is specifically as follows. A server first acquires a position of an MO (DevDetail here) of the DDF management node. The server retrieves the position of the DevDetail MO in the device management tree by delivering a Get command, or stores position information of the DevDetail in DevInfo of the terminal. The terminal first reports the position (a root node path) of the DevDetail MO to the server (which may be reported in the first DM session, reported only once, or reported in each session) in the session request message. Subsequently, the server locates the position of the DDF management node through the position information and the structure of the DevDetail MO, so as to acquire its value (that is, the DDF) by delivering the Get command. The DDF is used as a reference for the subsequent management.

In a third method, after a certain server account is configured for a terminal (for example, after bootstrap), the terminal initiates a registration session to the server initiatively (a first session between the terminal and the server). The DDF is reported in the session. In the subsequent management session, the DDF is not reported initiatively unless the server delivers a Get command for reacquisition.

In a fourth method, the terminal receives instruction information of the server. The instruction information is carried in a notification message sent by the server. The instruction information instructs the terminal to report a DDF of a terminal DM tree stored in the DDF management node or a DDF of a certain MO supported by the terminal. Subsequently, the terminal generates a session request message for initiating a management session according to the information in the notification. The DDF is carried in the session request message, and the specific carrying method is as follows. An alert type is extended for the terminal. The alert type and the DDF are carried in the alert command. If it is the DDF of the MO, an MOID may be further carried. The server identifies the DDF according to the alert type and the MOID.

The two methods for acquiring the DDF may solve the problem in the prior art that the server may not find a DDF corresponding to the server. Particularly, the DDF is relatively stable information, and the information has a large volume, so that frequent report causes pressure to the server and network transmission. In the methods, the terminal reports the DDF initiatively under certain conditions, or the server locates the node and acquires the DDF initiatively, so as to provide capabilities of locating and acquiring information for the server when necessary, so that pressure on the network and server is lowered to the greatest extent while the capability of acquiring the DDF is provided at the same time.

2. A management session can be established between the server and the terminal, which only means that the server can perform operations on the DM tree of the terminal. However, some functions need to rely on specific MO and a client program (which is referred to as a DM application) on the terminal, such as an SCOMO. Different terminals support different DM applications, which may be different implementation before delivery or a capability is supported after specific clients are installed in a subsequent use process. Whether the terminal supports a certain DM application is a basis for whether the DM application function can be achieved. Therefore, the terminal needs to inform the server of supported DM applications. In order to solve the problem in the prior art that difficulty of server management is increased because the server does not know the DM applications (that is, the MO type) supported by the terminal, in this embodiment, a management node is added in the management tree of the terminal to record the DM applications supported by the terminal. Each node stores DM applications supported by a terminal.

Referring to FIG. 6, in this embodiment, the added management node may be designed to include an internal node and its subnodes. For example, a "SupportedApp" node is set as an internal node, which may be a node in the DevInfo or the DevDetail MO. Its subnode "x*" is a leaf node, which may have multiple instances. Each instance corresponds to a DM application. The terminal maintains this node according to its actual conditions. For example, if a certain DM application is added in the terminal, the terminal adds a leaf node in the SupportedApp node and stores information of the DM application. As each MO has a corresponding MOID, for example, an MOID of a firmware MO is "urn:oma:mo:oma-fumo:1.0", the MOID of the supported MO is stored in the node, that is, the value of a . . . /SupportedApp/<x> node is the MOID.

For a DM application, no matter how many (0 or 1 or a plurality of) MO instances of the DM application exist in the management tree, as long as the terminal supports the DM application, only one MOID node for the DM application is added under the SupportedApp node. In the management process, steps of acquiring the DM applications supported by the terminal are as follows.

In Step A, the server determines that the DM applications supported by the terminal need to be acquired.

In Step B, the server sends a Get command to the SupportedApp node of the DM tree of the terminal to acquire its subnode and a value of the subnode, and the terminal returns a corresponding result.

In Step C, the server analyzes the obtained node value (MOID) to determine the DM applications supported by the terminal.

The method in this embodiment may solve the problem that the server does not know the DM applications supported by the terminal, and in the method, a specific management operation is delivered to make the management of the server more flexible and effective.

3. In the management process, the server needs to locate the MO of the terminal, so as to perform operations on the node in the MO to implement specific management functions. In the prior art, it is very difficult for the server to locate the management node of the terminal, air resources are consumed, and the server is under great pressure. In the present disclosure, in order to improve efficiency for the server to locate the MO in the DM tree of the terminal, a method for retrieving a position of a MO root node is provided. As shown in FIG. 7, the method includes the following steps.

A server sends a Get command to the terminal. The Get command carries information of a target operation path and value filtering information to be acquired.

After receiving the Get command of the server, the terminal is instructed to acquire structure information of a designated subtree and property information of a node according to the Get command. The property value and the structure information are returned to the server.

FIG. 7 only shows an embodiment of MO address retrieve. Specifically, the server may also send a Get command to the terminal, and the Get command carries an ID of an MO to be retrieved and carries a uniform resource identifier (URI) of a root node of a subtree to be retrieved and a parameter instructing the retrieve. The parameter instructs the terminal to return the URI of the root node of the MO of the ID of an MO in the device management tree.

After receiving the Get command, the terminal retrieves the URI instruction node and nodes satisfying the ID among all the internal subnodes, and returns a corresponding result to the server.

In this embodiment, the MO address retrieve may be specifically implemented in the following three modes.

In a first method, a property value is carried at the same time as the management tree structure is returned, which may be specifically as follows.

The server sends a Get command to the terminal. Path information of a target operation node in a terminal DM tree is carried in a "Target/LocURI" element of the Get command. At the same time, value filtering information that needs to be acquired is carried. The value filtering information instructs the terminal to return structure information of a subtree having the target operation node as a root in the device management tree and a property value of a designated property of each node in the subtree.

A format of the carried filter information may be <URI>?list=Struct+<property_name>. The "Struct" in the combined parameter instructs the terminal to return structure information of the node indicated by the URI in the device management tree and its subnodes. The structure is represented by the URI (carried in the "LocURI") of the node returned by the terminal. The <property_name> in the combined parameter is a property name of a certain node, so as to instruct the terminal to return a property value of the property of the node indicated by the URI and its subnodes. The property may be any property supported by the terminal, such as a node Type property, a node ACL property, a node value Format property, a node Title property, a node value Size property, a node modification time stamp (TStamp) property, or a node version number (VerNo) property. A use example is as follows.

```
    <Get>
        <CmdID>4</CmdID>
        <Item>
            <Target>
                <LocURI>./A/D?list=Struct+ACL</LocURI><!-- Return
the structure and related node ACL property values -->
            </Target>
        </Item>
    </Get>
```

After receiving the Get command of the server, the terminal is instructed to acquire structure information of the designate subtree and property information of the node according to the Get command (during the acquisition, it is authenticated whether the server has the ACL right of the management node, which specifically means a Get right here), and then returns the property value together with the structure information to the server.

The property information is carried in the "Result" command corresponding to the Get command (different nodes may be distributed in different Item subelements of the Result element, or distributed at different Result elements each including a single Item). The specific property value may be carried in the Result/Item/Data element and returned. The "Source/LocURI" element in the "Result" command carries a node URI and a parameter that indicates a property name. The composition is URI?prop=<property_name>. After receiving the command, the server analyzes a structure of a designated part of the device management tree according to the node URI, obtains property names corresponding to the property values carried in the Data from the ?prop=<property_name> part, and acquires the property values from the Data element. A use example is as follows.

```
<Results>
<CmdRef>2</CmdRef>
<CmdID>3</CmdID>
<Item>
   <Meta><Format xmlns="syncml:metinf">node</Format></Meta>
   <Source><LocURI>./A/C?prop=ACL</LocURI></Source>
   <Data>Get=*&Replace=ServerA</Data>
</Item>
<Item>
   ...
</Item>
</Results>
```

As the MOID of the MO in the device management tree is stored in the Type property of the MO root node, the <property_name> of the combined parameter is set to Type property, so as to return all MOIDs in the subtree at the same time as the subtree structure is returned. Specifically, the server makes determination after acquiring the Type property value of each node in the subtree. If the node is an internal node and the Type property value is non-empty, it is determined that the node is a root node of the MO and the non-empty Type property value is the MOID, to acquire the URI of the root node of the MO from the returned information. After acquiring the URI of the MO, the server sends a Get command to acquire more detailed information of the node in the MO, or sends a management command directly.

The method may solve the problem that the server may not acquire a certain property value of all management nodes in a certain management subtree in a device management tree in batch in a non-serialized mode. Through the method, a certain property value may be acquired at the same time when the subtree structure is acquired, so that interactions for property acquisition are decreased and efficiency is increased. At the same time, all MOs in the management subtree may be acquired by designating the property value as Type, so that the problem that all MOs in the management subtree may not be effectively acquired is solved.

In a second method, the terminal retrieves a root node of a specific MO, and returns a URI of the root node. The specific embodiment includes the following.

The server sends a Get command to the terminal. An identifier of an MO (MOID) to be retrieved is carried in an Item/Data element in the Get command. A URI of a root node of a subtree in which the MOID will be retrieved and a parameter instructing the retrieve are carried in the Item/Target/LocURI element. The parameter instructs the terminal to retrieve a URI of a root node of the occurrence of an MO identified by the MOID carried in the Item/Data element in a subtree of a device management tree presented by the Item/Target/LocURI element. A format of information that carries the URI of the root node of the subtree and the parameter instructing the retrieve may be URI?list=MO_ROOT. The message is carried in the DM message. A specific example of the command is as follows.

```
<Get>
<CmdID>4</CmdID>
<Item>
   <Target>
      <LocURI>./A?list=MO_ROOT</LocURI> <!-- Target
      URI and instruction parameter -->
   </Target>
   <Data>urn:oma:mo:oma-fumo:1.0</Data> <!—MOID -->
   </Item>
</Get>
```

After receiving the command, the terminal retrieves all nodes of which the server has ACL right (a Get right here) and which have Type property with value of the MOID carried in the Data element in the node, where the node corresponds to the root node URI in the command and its subnodes, and returns a result (that is, the URIs of the retrieved nodes) to the server. The retrieve process is only performed in internal nodes (that is, the Format property is node), but is not performed for the leaf nodes. Alternatively, the terminal stores an <MO root node, MOI> storage mapping table. After the Get command from the server is received, an MO position is rapidly acquired from the mapping table and a result is returned to the server. A method for returning the result includes the following steps.

If one or more nodes satisfying the retrieve conditions are found, after a Status of the Get command, all found results (that is, the root nodes URI of the occurrences of the MO) are returned through a Results command. Different nodes may be distributed in a multiple Item elements in the Results element, or distributed in different Results each including a single Item. The result may carry the MOID or not carry the MOID.

The method for returning the result carrying the MOID is as follows. The Item/Target/LocURI of the Results carries the URI of the node found by the terminal, and at the same time carries the parameter indicating the Type property: ?prop=Type, and the MOID is carried in the Item/Data. The method for returning the result carrying the MOID does not limit the number of Items in the corresponding Get command, that is, the server may carry multiple Items in the same Get command to retrieve root node URIs of the occurrences of MOs corresponding to multiple MOIDs from the terminal in the Get command. A specific use example is as follows.

```
<Results>
<CmdRef>2</CmdRef>
<CmdID>3</CmdID>
<Item>
   <Meta><Format xmlns="syncml:metinf">node</Format></Meta>
   <Source><LocURI>./A/C?prop=Type</LocURI></Source>
   <Data>urn:oma:mo:oma-fumo:1.0</Data>
</Item>
</Results>
```

A method for returning a result not carrying the MOID is as follows. Only the URI of the node found by the terminal is carried in the Item/Target/LocURI of the Results. The method for returning the result not carrying the MOID requires that the Get command corresponding to the result may only carry one Item, that is, the server retrieves root node URIs of the occurrences of an MO corresponding to one MOID from the terminal in the Get command. If multiple Items are carried, the server is unable to differentiate which Item corresponds to the returned result. A use example is as follows.

```
<Results>
<CmdRef>2</CmdRef>
<CmdID>3</CmdID>
<Item>
    <Meta><Format xmlns="syncml:metinf">node</Format></Meta>
    <Source><LocURI>./A/C</LocURI></Source>
</Item>
</Results>
```

After acquiring the URI of the MO, the server may send a Get command to acquire more detailed information of nodes in the MO, or send a management command directly.

2) If no nodes satisfying the conditions are found (for example, a target URI in the Get command refers to a leaf node, or although the target URI in the Get command refers to an internal node, there is no any occurrence of the MO identified by the MOID in the subtree rooted at the target URI), no Results are returned, and "404 Not Found" is returned in the "Status" command corresponding to the Get command.

In the second method that the terminal retrieves a root node of a specific MO and returns the URI of the root node, a specific MOID may not be designated, that is, the Item element of the Get command does not have the Data subelement. After receiving the command, the terminal retrieves MOIDs of all MOs and the root node URIs of the MOs under the node corresponding to the target URI, and returns a result. The retrieve method may be as follows. All nodes that have a non-empty Type property value in all the internal subnodes (that is, a Format property value of the node is node) of the node corresponding to the target URI are retrieved, or a mapping table is maintained at the terminal. When receiving the Get command of the server, the terminal retrieves in the mapping table directly. The method for returning the result is the same as the method for returning a result carrying the MOID.

In a third method, a management tree corresponding to a terminal is maintained at the server side. According to commands of modifying a management tree node sent by a device management tree such as Replace, Copy, Delete, and Add, when the operation is successfully accomplished, the server maintains the management tree stored by the server correspondingly. When a structure of the device management tree needs to be obtained, the server first acquires a structure of a target operation terminal subtree maintained at the server side to determine a URI of the target operation node, generates a management command, and delivers the command to the target operation terminal.

In this embodiment, the method is to solve the problem that it is difficult for the server to locate a position of an MO in a terminal DM tree. The work that the server retrieves the position of the MO in the terminal DM tree is shared by the server and terminal, so that complicated logics of locating the MO are accomplished by the terminal locally, which improves the efficiency that the server locates the position of the MO in the terminal DM tree effectively, decreases interactions during the management operation, improves the management efficiency, and lowers the pressure on the server and network transmission.

4. In a management process, the management command delivered by the server to the terminal may carry a plurality of Items to achieve the function that the same management command operates a plurality of management nodes of the terminal. For example, the Replace grammar is <!ELEMENT Replace (CmdID, NoResp?, Cred?, Meta?, Item+)>, that is, the Replace command may carry a plurality of Items to instruct the terminal to execute a Replace action for a plurality of management tree nodes. Sometimes the plurality of Items needs to be processed sequentially at the terminal and sometimes may be processed non-sequentially. The server determines whether the execution is sequential to instruct the terminal to execute multiple Items in a management command sequentially.

As shown in the embodiment in FIG. 8, a method for managing an execution mode of a command is provided, which includes the following steps:

An instruction of executing a plurality of sub-items in a management command sequentially is carried in the management command sent by a server.

After receiving the management command, the terminal parses the instruction of sequential execution, and executes a management command action on the management node corresponding to each sub-item in the management command sequentially.

Specifically, an instruction of executing Items sequentially is carried in the management command delivered to the terminal by the server. The carrying method is as follows (A Replace command is taken as an example and the carrying method for other management commands are similar to the Replace command).

A property is carried in a parent element of an Item element. The property indicates that the subelements are executed sequentially. Taking the management command Replace as an example, a DTD that defines an instruction property for the Replace may be <!ATTLIST Replace order (Sequence | Any) "Any">. A value of the property order has the following meanings. "Any" represents that an execution mode of the terminal is not limited. The "Sequence" represents that the terminal is instructed for sequential execution. An example after the property is added is as follows:

```
<Replace order="Sequence">
    ...
    <Item>...</Item>
    <Item>...</Item>
</Replace>
```

A subelement for instruction is added in a parent element of the Item element (the element is a brother element of the Item element), the DTD after the subelement is added is defined as <!ELEMENT Replace (CmdID, NoResp?, Cred?, Meta?, Order?, Item+)>

<!ELEMENT Order(Sequence | Any)>

A shell element (that is, a subelement of the management command and at the same time a parent element of the Item) is added for the Item to be executed sequentially. The shell element is only to inform the terminal that the elements in the shell need to be executed sequentially.

After the terminal parses the instruction of executing Items sequentially carried in the Replace command, the Replace command is executed for the Item instruction node sequentially.

The method in this embodiment is to solve the problem that the server may not instruct the terminal to execute the management command sequentially for a plurality of target operation items in the same management command, in which method the server may flexibly control the execution mode of the management command by the terminal and lowers the execution error probability.

Figure 9:
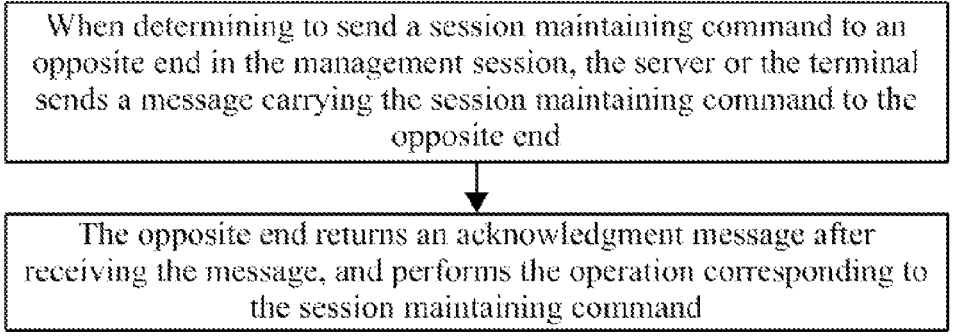
FIG. 9 is a flow chart of a method for maintaining a management session according to an embodiment of the present disclosure.

Before the management action of the DM is executed, a management session needs to be established between a server and a terminal firstly. All management commands are accomplished in the management session. It might take a long time for the server or the terminal to process an action. Alternatively, it is expected that a management action needs to be sent before long. In order to reduce the cost for reestablishing a session, the current session may be maintained. As shown in the embodiment in FIG. 9, a method for maintaining a management session is provided, which includes the following steps.

When determining that a session maintaining command needs to be sent to an opposite end in a management session, the server or the terminal sends a message carrying the session maintaining command to the opposite end.

After receiving the message, the opposite end returns the acknowledgment message, and executes operations corresponding to the session maintaining command.

In this embodiment, two maintaining methods are designed for the session, which are specifically as follows.

In order to avoid interruption during the session, a session maintaining command may be designed. When determining that a session maintaining action needs to be performed (for example, when it is determined that a duration of data processing is long), the server or terminal sends a "SyncML" message to the other party. The message carries the session maintaining command and the other party responds with an acknowledgment. The process may be executed repetitively when necessary until a sender of the session maintaining command sends a substantive management command to the other party or informs the other party to end the session. If the "SyncML" message carrying the session maintaining command includes other management commands, the other party may neglect the session maintaining command.

Figure 10:
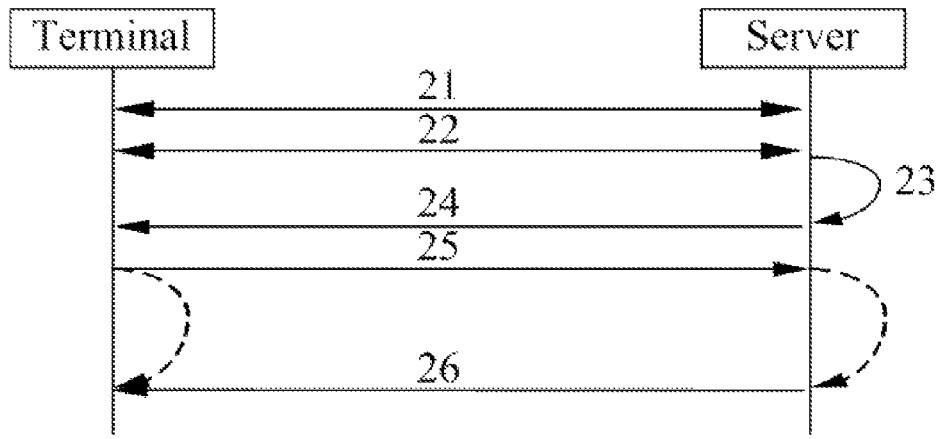
FIG. 10 is a flow chart of a parsing process of the method for maintaining a management session according to an embodiment of the present disclosure.

As shown in the embodiment in FIG. 10, taking that the server sends the session maintaining command as an example, a process for maintaining a session (the process that the terminal sends the session maintaining command is similar, the description of which is omitted here) is illustrated.

In Step 21, authentication is performed on the terminal and the server, and a management session is established between the terminal and the server.

In Step 22, interaction of a DM command is performed for the two parties.

In Step 23, the server processes the received management command or performs internal data processing, and the session is waiting.

In Step 24, the server sends a session maintaining command when the server determines that the session needs to be maintained (if the processing duration inside the server causes session interruption or timeout).

In Step 25, the terminal sends a session maintaining command acknowledgment message, and the two parties maintain the session until the server side sends a new management message. The management message carries the management command or the session maintaining command, or the management message is an empty message that does not carry any management command.

In Step 26, the server finishes processing the terminal data, and generates a management command to be sent to the terminal according to the processing result.

Specifically, the session maintaining command may use an Alert command, and a new type code "Alert Code" may be designed for the Alert command. The meaning of the code is as shown in Table 4.

TABLE 4

Session maintaining code and corresponding meaning

| Type Code | Meaning | Description |
| --- | --- | --- |
| 1221 or 1227 | Session maintain | Instruct an opposite end to maintain a session. |

A specific use example of the command is as follows.

```
<Alert>
  <CmdID>2</CmdID>
  <Data>1221</Data> <!-- Session maintaining instruction code -->
</Alert>
```

The session maintaining command may not carry any other data (for example, an Item). After receiving the session maintaining command sent by the server, the terminal does not perform any substantive management actions, and an acknowledgment message for the command is returned, which is as follows.

```
<Status>
  <CmdID>2</CmdID>
  <MsgRef>1</MsgRef>
  <CmdRef>2</CmdRef>
  <Cmd>Alert</Cmd>
  <Data>200</Data>
</Status>
```

The embodiment solves the problem that one party sends a session maintaining command to an opposite end when the party determines that the other party needs to be instructed to maintain the session, so as to decrease abnormal interruption of the session and improve the efficiency.

The management of the terminal device is in a client/server (C/S) mode. The server determines whether a management action is to be delivered and which management action is to be delivered. The server is in a dominant position. Therefore, the ending of the session in the DM is determined by the server.

In the embodiment of the present disclosure, a command for instructing to end a session is designed. The command is sent to the terminal by the server. The command may be separately placed in a packet to be delivered to the terminal, or be packaged with a final group of management commands delivered to the terminal by the server and then delivered to the terminal. In the former mode, the terminal ends the session normally after receiving the command. In the latter mode, the terminal executes other management commands in the packet first and ends the session directly after the execution is completed and execution results of related management commands are not returned to the server. The terminal may also buffer execution results of the management commands in the final packet, such that the server may acquire the results when necessary. The command for instructing to end the session may be implemented through an Alert command, and a specific Code needs to be designed for the Alert command to instruct to end the session normally, for example, the Code is 1210.

In the prior art, the method for determining whether the session is to be ended is as follows: the terminal ends the session if the server sends an empty message. The instruction is unclear for the terminal and adversely affects accurate management of the terminal. The specific end instruction command designed in this embodiment facilitates the accurate management of the terminal.

Figure 11:
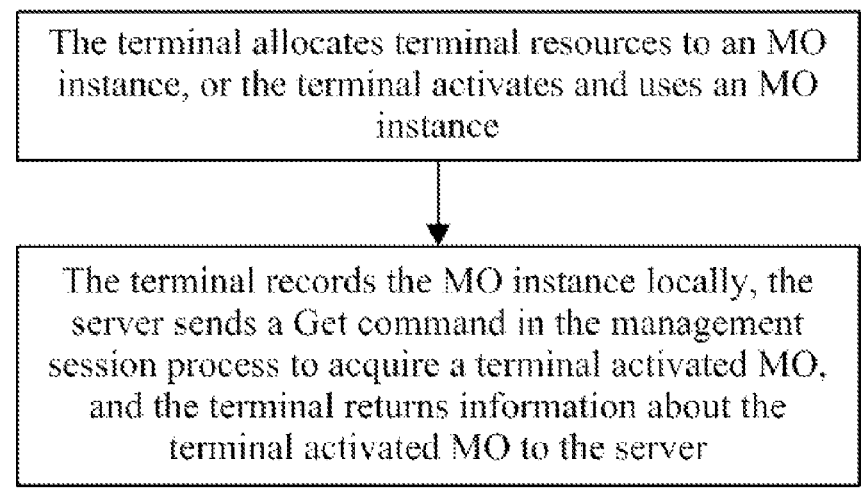
FIG. 11 is a flow chart of a method for obtaining an activated MO of a terminal according to an embodiment of the present disclosure.

6. At the terminal, certain MOs may have a plurality of instances. However, sometimes, only one MO instance is activated. For example, for an MO of a terminal resource operation type, as the terminal resources are limited and exclusive, if a plurality of MO instances exists, at the same time or within a certain period of time, the resources may only be occupied and operated (that is, activated) by one MO instance only. The management actions delivered by the server through other MO instances are rejected, and an error code 403, 405, or 500 is returned. In the prior art, when a plurality of MO instances exists in the terminal, the server does not know the currently activated instance, so the difficulty of server management is increased. As shown in FIG. 11, a method for obtaining a terminal activated MO is provided, which includes the following steps.

The terminal allocates terminal resources to an MO instance, or the terminal activates and uses an MO instance, that is, the MO instance serves as the currently available MO.

When recording the MO instance locally, the server sends a Get command to the terminal in the session management process to acquire the terminal activated MO. The terminal returns information about the activated MO to the server.

In this embodiment, two methods for indicating the currently activated MO instance (that is, the MO currently occupying the terminal resources and capable of operating the terminal resources) are as follows.

The terminal maintains an activated MO list locally. The activated MO list is not represented in a device management tree. The server acquires the data by sending a Get command to a root node of the terminal and carrying a parameter.

The parameter carried in the Get command may be carried in Get/Item/Target/LocURI, which may be designed as, for example, .?list=ActivedResourceMO. The terminal returns a URI of a root node of an MO that corresponds to the terminal resources and is activated. The server may carry the Data element in the Item of the command to instruct the terminal to return a certain type of specific MOs, and a value of the Data element is MOID. A use example is as follows.

```
<Get>
    <CmdID>4</CmdID>
    <Item>
        <Target>
            <LocURI>.?list=ActivedResourceMO</LocURI> <!-- A
target URI and an instruction parameter -->
        </Target>
        <Data>urn:oma:mo:oma-fumo:1.0</Data> <!-- An management
        object MOID -->
    </Item>
</Get>
```

Figure 12:
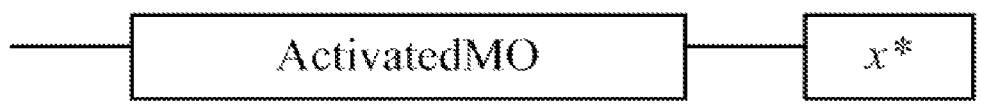
FIG. 12 is a schematic view of storing information about an activated MO in a device management tree according to an embodiment of the present disclosure.
Figure 13:
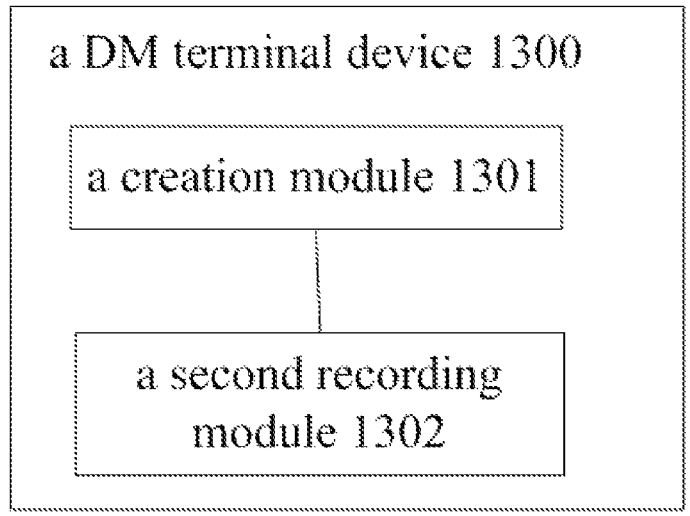
FIG. 13 is a schematic view of a DM terminal according to an embodiment of the present disclosure.
Figure 14:
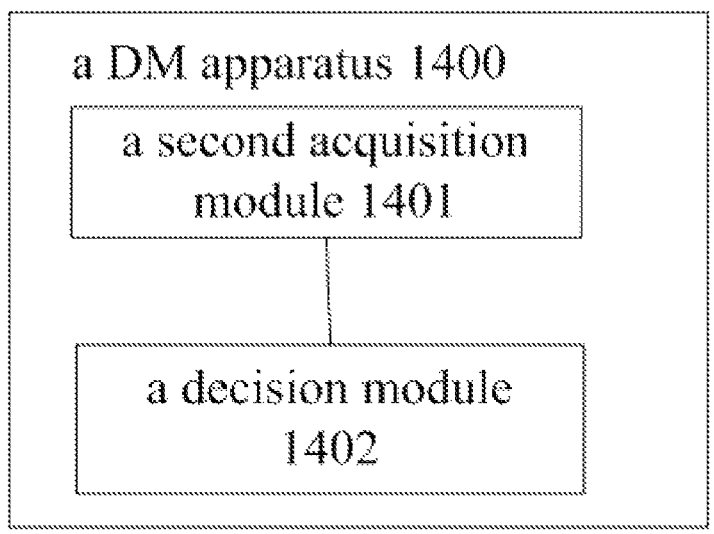
FIG. 14 is a schematic view of a DM apparatus according to an embodiment of the present disclosure.
Figure 15:
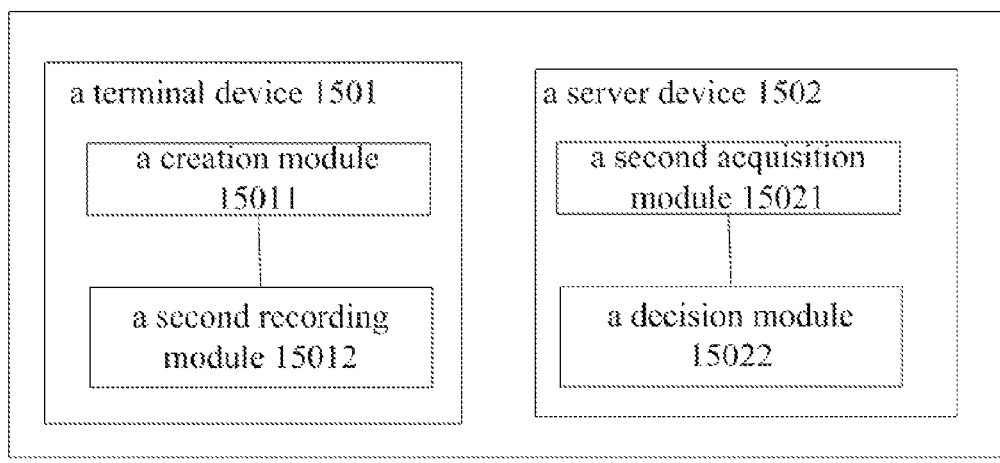
FIG. 15 is a schematic view of a management terminal system according to an embodiment of the present disclosure.

The terminal stores information of the activated MO instance in the management tree, which specifically includes the following.

a. A subtree of the management tree is added in the device management tree. A URI list of root nodes of all activated MOs of the terminal is stored in the subtree of the management tree. The added management subtree is as shown in FIG. 12, and the management subtree in which the activated MO list is stored may be stored in the DevDetail MO. The server may deliver a Get command to the subnode of the "ActivatedMO" node directly to acquire its value, so as to obtain the terminal activated MO. The specific commands and operations are similar to those of other nodes, the description of which is omitted here.

b. Whether the MO instance is an activated MO instance is recorded in the node property value of the root node of the MO instance. Subsequently, the server acquires the property value of the root node of the MO directly to determine whether the MO instance is the activated MO instance. The specific method is as follows.

A structure of a Type property value of the root node of the existing MO is extended. The modified value structure may carry a composition value. The composition value includes two fields: MOID and Activated or Deactivated. The two fields are communicated with a plus sign. A use example is as follows.

The Type property value of a root node of a certain MO is MOID+Activated.

The terminal determines an activation status of the MO in the device management tree, and maintains the Type property value of the root node of the MO.

When obtaining the activated MO of the terminal, the server sends a Get command to the Type property of the root node of the MO to acquire its value, and subsequently extracts a value of the Activated/Deactivated field to determine whether the MO instance is an activated MO.

In this embodiment, the method that the terminal identifies the activated MO and subsequently the server acquires the activated MO is provided, so as to solve the problem in the prior art that the server may not locate the operations rapidly to activate the MO because the activated MO may not be identified, so that management efficiency is improved.

The present disclosure has a plurality of specific implementations in different forms. In the following, the technical solutions of the present disclosure are illustrated with reference to FIG. 2-12. This does not mean that the specific examples of the present disclosure are only limited to specific processes or structures according to the embodiments. Persons of ordinary skill in the art should understand that the specific implementations provided in the foregoing are only some examples among many preferred solutions.

In the embodiment, the present disclosure provides a DM terminal, which includes a first receiving module and a configuration module. The first receiving module is adapted to receive bootstrap information of a server, in which the bootstrap information includes a ServerID of the server. The configuration module is adapted to perform bootstrap or re-bootstrap through the bootstrap information.

Furthermore, this embodiment may further include an alert module and a first recording module. The alert module is adapted to send a session request message to the server, in which the session request message carries alert information for bootstrap or re-bootstrap of the terminal. The first recording module is adapted to record configuration mode information of bootstrap or re-bootstrap of the terminal in a management node of a server account MO of the server in a terminal DM tree.

The configuration module includes a retrieve unit, a first processing unit, and a second processing unit. The retrieve unit is adapted to retrieve whether a server account MO corresponding to the ServerID exists in the terminal DM tree. The first processing unit is adapted to differentiate whether the bootstrap is repetitive bootstrap or re-bootstrap and perform corresponding operations when the retrieve unit finds the server account MO corresponding to the ServerID in the terminal DM tree. The second processing unit is adapted to generate the server account MO of the server in the terminal DM tree according to the bootstrap information when the retrieve unit fails to find the server account MO corresponding to the ServerID in the terminal DM tree.

In an embodiment, the present disclosure provides a DM apparatus, which includes a first receiving module and an authentication module. The first receiving module is adapted to receive a session request message carrying alert information of bootstrap or re-bootstrap sent by a terminal. The authentication module is adapted to generate authentication information according to the alert information to authenticate the terminal.

In an embodiment, the present disclosure provides another DM apparatus, which includes a first sending module and a first acquisition module. The first sending module is adapted to send a Get command to acquire a value of a management node that records configuration mode information of bootstrap or re-bootstrap of a terminal in a server account MO in a terminal DM tree. The first acquisition module is adapted to acquire the configuration mode information.

In an embodiment, the present disclosure provides a bootstrap system, which includes a terminal and a server. The terminal includes a first receiving module, a configuration module, and an alert module. The first receiving module is adapted to receive bootstrap information of the server, in which the bootstrap information includes a ServerID of the server. The configuration module is adapted to perform bootstrap or re-bootstrap through the bootstrap information. The alert module is adapted to send a session request message, in which the session request message carries alert information of bootstrap or re-bootstrap of the terminal. The server includes a first receiving module and an authentication module. The first receiving module is adapted to receive the session request message carrying the alert information of bootstrap or re-bootstrap sent by the terminal. The authentication module is adapted to generate authentication information according to the alert information to authenticate the terminal.

In an embodiment, the present disclosure provides another bootstrap system, which includes a terminal and a server. The terminal includes a first receiving module, a configuration module, and a first recording module. The first receiving module is adapted to receive bootstrap information of the server, in which the bootstrap information includes a ServerID of the server. The configuration module is adapted to perform bootstrap or re-bootstrap through the bootstrap information. The first recording module is adapted to record configuration mode information of bootstrap or re-bootstrap of the terminal in a management node of a server account MO of the server in the terminal DM tree. The server includes a first sending module and a first acquisition module. The first sending module is adapted to send a Get command to acquire a value of a management node that records configuration mode information of bootstrap or re-bootstrap of the terminal in the server account MO in the terminal DM tree. The first acquisition module is adapted to acquire the configuration mode information.

In an embodiment, the present disclosure provides another DM terminal 1300, which includes a creation module 1301 and a second recording module 1302. The creation module 1301 is adapted to add a management node in a DM tree of the terminal. The second recording module 1302 is adapted to record DM object types supported by the terminal 1300 in the management node added in the DM tree of the terminal.

In an embodiment, the present disclosure provides another DM apparatus 1400, which includes a second acquisition module 1401 and a decision module 1402. The second acquisition module 1401 is adapted to acquire a value of a management node for recording DM object types supported by the terminal 1300 added in a DM tree of a terminal in a management session with the terminal 1300. The decision module 1402 is adapted to determine the DM object types supported by the terminal 1300 according to the value of the management node.

In an embodiment, the present disclosure provides a management terminal system 1500, which includes a terminal 1501 and a server 1502. The terminal 1501 includes a creation module 15011 and a second recording module 15012. The creation module 15011 is adapted to add a management node in a DM tree of the terminal. The second recording module 15012 is adapted to record DM object types supported by the terminal in the management node added in the DM tree of the terminal. The server 1502 includes a second acquisition module 15021 and a decision module 15022. The second acquisition module 15021 is adapted to acquire a value of the management node for recording the DM object types supported by the terminal added in the DM tree of the terminal in a management session with the terminal. The decision module 15022 is adapted to determine the DM object types supported by the terminal according to the value of the management node.

In an embodiment, the present disclosure further provides a DM terminal, which includes a second receiving module and an execution module. The second receiving module is adapted to receive path information carrying a target operation node of a terminal DM tree and a Get command of value filtering information that needs to be acquired, in which the value filtering information includes an instruction of returning structure information of a subtree having the target operation node as a root and an instruction of returning a property value of a designated property of all nodes in the subtree. The execution module is adapted to acquire the structure information of the subtree and the property value of each node in the subtree according to the path information and value filtering information of the target operation node, and return the property value and the structure information.

In an embodiment, the present disclosure provides another DM apparatus, which includes a second sending module and a third receiving module. The second sending module is adapted to send a Get command, in which the Get command carries path information of a target operation node in a terminal DM tree and value filtering information that needs to be acquired, and the value filtering information includes an instruction of returning structure information of a subtree having the target operation node as a root and an instruction of returning a property value of a designated property of all nodes in the subtree. The third receiving module is adapted to receive the structure information of the subtree and the property value of each node in the subtree returned by a terminal.

In an embodiment, the present disclosure provides a system for acquiring a management node property, which includes a terminal and a server. The terminal includes a second receiving module and an execution module. The second receiving module is adapted to receive a Get command carrying path information of a target operation node in a terminal DM tree and value filtering information that needs to be acquired, in which the value filtering information includes an instruction of returning structure information of a subtree having the target operation node as a root and an instruction of returning a property value of a designated property of all nodes in the subtree. The execution module is adapted to acquire the structure information of the subtree and the property value of each node in the subtree according to the path information of the target operation node and the value filtering information, and return the property value and the structure information together. The server includes a second sending module and a third receiving module. The second sending module is adapted to send a Get command, in which the Get command carries the path information of the target operation node in the terminal DM tree and the value filtering information that needs to be acquired, and the value filtering information includes the instruction of returning the structure information of the subtree having the target operation node as the root and the instruction of returning the property value of the designated property of all nodes in the subtree. The third receiving module is adapted to receive the structure information of the subtree and the property value of each node in the subtree returned by the terminal.

In an embodiment, the present disclosure provides another DM terminal, which includes a fourth receiving module and a retrieve module. The fourth receiving module is adapted to receive a Get command, in which the Get command carries an ID of an MO to be retrieved, information about a root node path of a subtree to be retrieved in a device management tree, and a parameter instructing retrieve, and the parameter instructs the terminal to retrieve and return the root node path of the MO in the subtree to be retrieved. The retrieve module is adapted to retrieve the MO in the subtree to be retrieved and return the root node path of the found MO.

In an embodiment, the present disclosure provides another DM apparatus, which includes a third sending module and a fifth receiving module. The third sending module is adapted to send a Get command, in which the Get command carries an ID of an MO to be retrieved, information about a root node path of a subtree to be retrieved in a device management tree, and a parameter instructing retrieve, and the parameter instructs a terminal to retrieve and return the root node path of the MO in the subtree to be retrieved. The fifth receiving module is adapted to receive the root node path of the MO in the subtree to be retrieved returned by the terminal.

The present disclosure provides a system for retrieving an MO address, which includes a terminal and a server. The terminal includes a fourth receiving module and a retrieve module. The fourth receiving module is adapted to receive a Get command, in which the Get command carries an ID of an MO to be retrieved, information about a root node path of a subtree to be retrieved in a device management tree, and a parameter instructing retrieve, and the parameter instructs the terminal to retrieve and return the root node path of the MO in the subtree to be retrieved. The retrieve module is adapted to retrieve the MO in the subtree to be retrieved and return the root node path of the found MO. The server includes a third sending module and a fifth receiving module. The third sending module is adapted to send a Get command, in which the Get command carries the ID of the MO to be retrieved, the information about the root node path of the subtree to be retrieved in the device management tree, and the parameter instructing retrieve, and the parameter instructs the terminal to retrieve and return the root node path of the MO in the subtree to be retrieved. The fifth receiving module is adapted to receive the root node path of the MO in the subtree to be retrieved returned by the terminal.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a read only memory (ROM), a random access memory (RAM), a magnetic disk or an optical disk.

Finally, it should be noted that the above embodiments are merely provided for describing the technical solutions of the present disclosure, but not intended to limit the claims. It should be understood by persons of ordinary skill in the art that although the present disclosure has been described in detail with reference to the embodiments, modifications may be made to the technical solutions described in the embodiments, or equivalent replacements may be made to some technical features in the technical solutions, without departing from the spirit and scope of the claims.

What is claimed is:

1. A method for managing a device management (DM) terminal device, comprising:
    receiving, by a DM terminal device, a Get command from a DM server to acquire management object (MO) type supported by the DM terminal device;
    acquiring, by the DM terminal device, management object identifier (MOID) corresponding to the MO type supported by the DM terminal device from an interior node in a DM tree of the DM terminal device, wherein the interior node groups together information of the MO type supported by the DM terminal device, the information of the MO type comprise the MOID corresponding to the MO type and the MOID is stored in a leaf node under the interior node, wherein the leaf node is added as subnode of the interior node when the MO type is newly supported by the DM terminal device, wherein there is only one MOID for each MO type grouped in the internal node, regardless whether the MO type supported by the terminal has MO instances on the DM tree; and
    returning, by the DM terminal device, the MOID acquired to the DM server, wherein the MOID can be used to discover DM applications supported by the DM terminal device.

2. A device management (DM) terminal device which communicates to a network wherein the DM terminal device comprises:
    a memory storing a DM tree and non-transitory instructions; and
    a processor coupled to the memory that reads and executes the instructions to:
    receive a Get command from a DM server to a management object (MO) type supported by the DM terminal device;
    acquire management object identifier (MOID) corresponding to the MO type supported by the DM terminal device from an interior node in the DM tree stored in the memory of the DM terminal device, wherein the interior node groups together information of the MO type supported by the DM terminal device, the information of the MO type comprise the MOID corresponding to the MO type and the MOID is stored in a leaf node under the interior node, wherein the leaf node is added as subnode of the interior node when the MO type is newly supported by the DM terminal device, wherein there is only one MOID for each MO type grouped in the internal node, regardless whether the MO type supported by the terminal has MO instances on the DM tree; and
    return the MOID acquired to the DM server, wherein the MOID can be used to discover DM applications supported by the DM terminal device.

3. A non-transitory machine-readable storage medium having stored there on a computer program comprising at least one code section for a method for managing a device management (DM) terminal device, wherein the at least one code section being executable by a machine for causing the machine to perform acts of:

receiving a Get command from a DM server to acquire management object (MO) type supported by the DM terminal device;

acquiring management object identifier (MOID) corresponding to the MO type supported by the DM terminal device from an interior node in a DM tree of the DM terminal device, wherein the interior node groups together information of the MO type supported by the DM terminal device, the information of the MO type comprise the MOID corresponding to the MO type and the MOID is stored in a leaf node under the interior node, wherein the leaf node is added as subnode of the interior node when the MO type is newly supported by the DM terminal device, wherein there is only one MOID for each MO type grouped in the internal node, regardless whether the MO type supported by the terminal has MO instances on the DM tree; and returning the MOID acquired to the DM server, wherein the MOID can be used to discover DM applications supported by the DM terminal device.

* * * * *